United States Patent [19]
Han-Teng

[11] Patent Number: 5,448,837
[45] Date of Patent: Sep. 12, 1995

[54] STRUCTURE OF MEASURING TAPE

[76] Inventor: Cheng Han-Teng, No. 6-1, Lane 195, Hua Cheng Rd., Hsin Chuang Shih, Taipei Hsien, Taiwan

[21] Appl. No.: 110,715

[22] Filed: Nov. 2, 1993

[51] Int. Cl.6 .............................................. G01B 3/10
[52] U.S. Cl. .................................... 33/761; 33/767
[58] Field of Search ................. 33/755, 761, 762, 767

[56] References Cited

U.S. PATENT DOCUMENTS

| | | | |
|---|---|---|---|
| 3,215,359 | 11/1965 | Sanders | 242/250 |
| 3,561,695 | 2/1971 | Wood | 242/250 |
| 4,186,490 | 2/1980 | Quenot | 33/762 |
| 4,551,847 | 11/1985 | Caldwell | 33/755 |
| 4,765,063 | 8/1988 | Sing | 33/755 |
| 5,044,089 | 9/1991 | Petkovic et al. | 33/767 |

*Primary Examiner*—Alvin Wirthlin
*Attorney, Agent, or Firm*—Bacon & Thomas

[57] ABSTRACT

Disclosed is a measuring tape including a tape reel driven by a reversible motor through an annular wheel via a first transmission gear set to let off a tape blade for taking measurements or to rewind it by means of the control of a switch, a guide roller and a pressing roller driven by the annular wheel through a second transmission gear set to guide out the tape blade at a higher speed than the tape reel so as to prevent the tape blade from being loosened, and a release control mechanism controlled by the switch to move the pressing roller within the operative and the non-operative positions.

3 Claims, 5 Drawing Sheets

STRUCTURE OF MEASURING TAPE

BACKGROUND OF THE INVENTION

The present invention relates to measuring tools, and more specifically the present invention relates to a measuring tape which can be conveniently operated with one hand, and which has a mechanism to keep the blade be stretched when it is being delivered out for taking measurements.

A variety of measuring tapes have been disclosed, and have appeared on the market. These measuring tapes commonly use a spiral spring for automatic rewinding control. However, using a spiral spring to rewind the blade may cause the blade connecting end to be damaged or loosened easily, more particularly after a long use. Because the blade should be pulled out with the hand, the hand may be injured by the sharp edge of the blade during the operation. Further, these measuring tapes require two people to take a long measurement. It is not easy and may cáuse an error to,take a long measurement by one operator.

There is also known an electronic measuring tape which uses a magnetic reader to read measurements, and a motor-driven ratchet wheel mechanism to rewind the magnetic tape. This structure of electronic measuring tape is still not satisfactory in function because of the following disadvantages. 1. It is not practical for taking longer measurements by an operator without the assistance of another person. 2. The magnetic tape may be worn away gradually to effect its precision. 3. It is not suitable for taking measurements within the effect of a magnetic field. 4. The electronic circuit and component parts may be damaged easily by moisture. 5. The ratchet wheel may fail to work properly after long uses. 6. The teeth of the ratchet wheel may be damaged easily causing a transmission error. 7. The true-zero hook may be damaged or loosened easily because it strikes against the casing of the measuring tape each time the tape is taken up. 8. The user's hand may be injured by the tape as the tape is being taken up rapidly.

Further, either of the aforesaid measuring tape C, the tape blade C1 may be loosened or caused to deform easily, as it is been let off by the motor C2, as shown in FIG. 5. If the tape blade is loosely wound round the reel or deformed, it may get stuck half way up.

SUMMARY OF THE INVENTION

The present invention has been accomplished under the aforesaid circumstances. It is therefore an object of the present invention to provide a measuring tape which sends out the tape blade for taking measurements and rewinds it automatically. It is another object of the present invention to provide a measuring tape which is easy of use and suitable for measuring a longer distance. It is still another object of the present invention to provide a measuring tape which is durable in use. It is still another object of the present invention to provide a measuring tape which is practical for one-hand operation even for a handicapped person. It is still another object of the present invention to provide a measuring tape which uses a rechargeable battery to provide the necessary working voltage to the motor drive thereof so as to minimize power supply cost. It is still another object of the present invention to provide a measuring tape which has a tape blade output delivery control mechanism to guide out the tape blade smoothly without causing it to deform. It is still another object of the present invention to provide a measuring tape which has means to prohibit the tape blade from being loosened during its delivery. It is still another object of the present invention to provide a measuring tape which is light weight.

According to the preferred embodiment of the present invention, an annular wheel is driven by a motor through a drive gear, a step gear and a transmission gear, to turn a tape reel in either direction so as to let off the tape blade or take it up automatically. A pressing roller is driven by the annular wheel through a big gear and a small gear to guide out the tape blade over a guide roller. The revolving speed of the pressing roller is faster than the tape reel so that the tape blade is stretched when it it being guided out of the casing of the measuring tape. A pull rod is controlled by the forward-/backward/lock control switch of the measuring tape to lift the pressing roller from the guide wheel via a spring loaded movable frame as the tape blade is being taken up, and therefore no resisting force is given to the tape blade in the rewinding operation.

DETAILED DESCRIPTION OF THE PREFERRED EMBODIMENT

Figure 1:
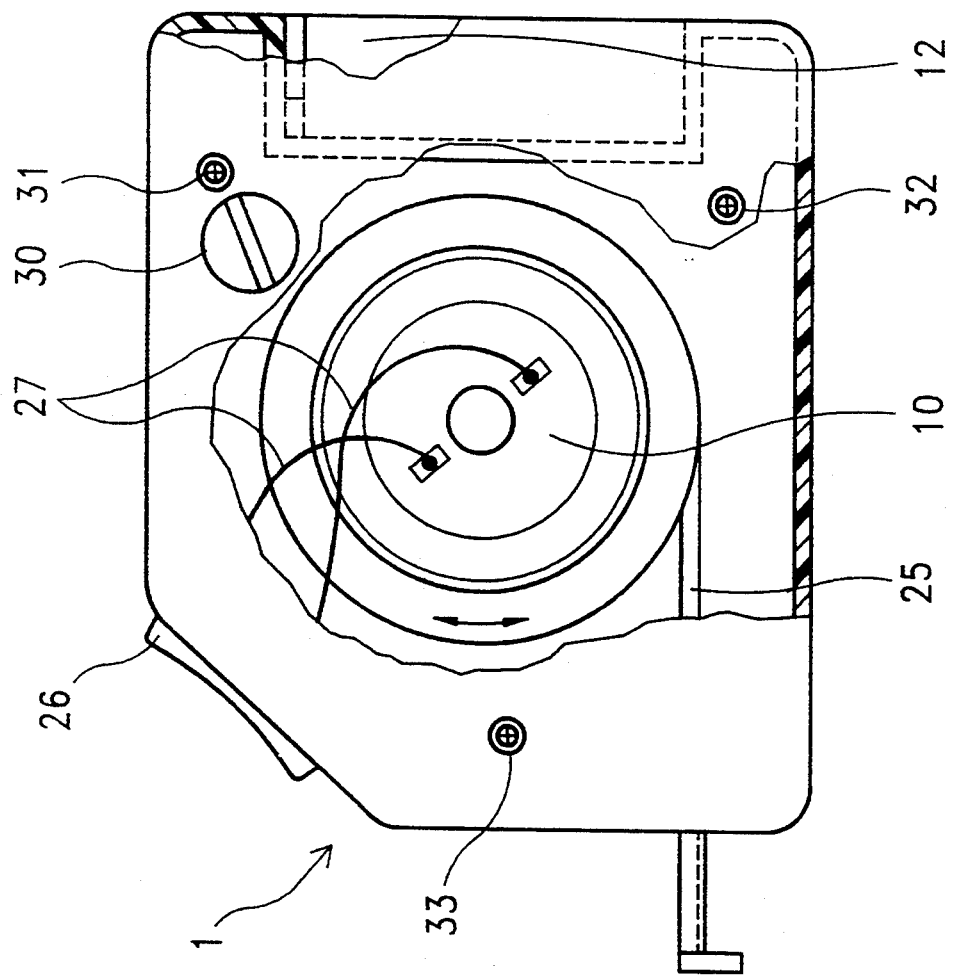
FIG. 1 is a front plan view of a measuring tape constructed according to the preferred embodiment of the present invention.
Figure 3:
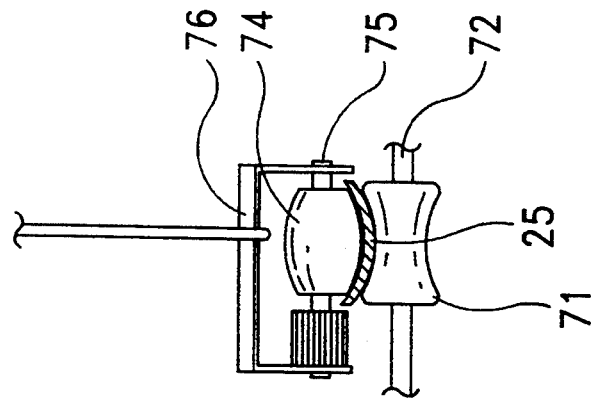
FIG. 3 is a partial enlarged view according to FIG. 2 showing the blade guided between the pressing roller and the guide roller.
Figure 2:
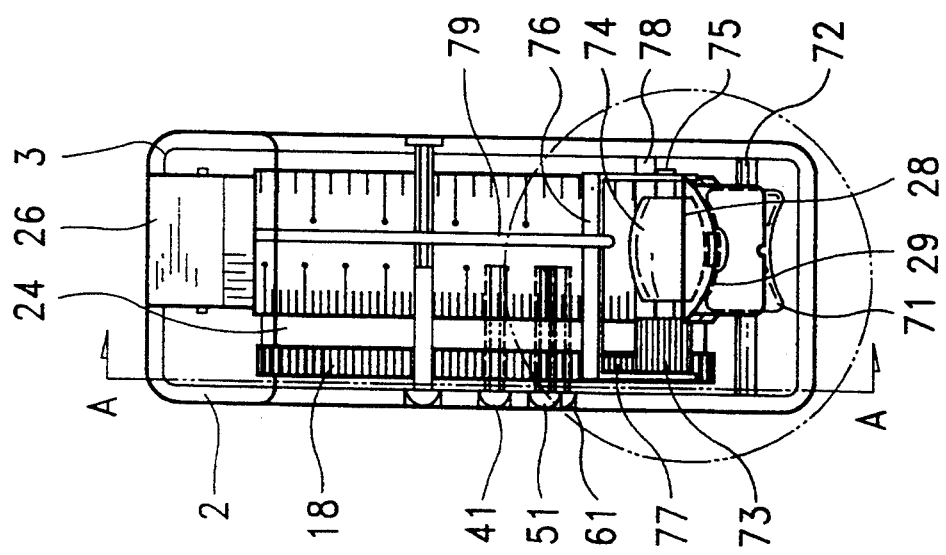
FIG. 2 is a side view showing the inside construction of the outlet side.
Figure 2B:
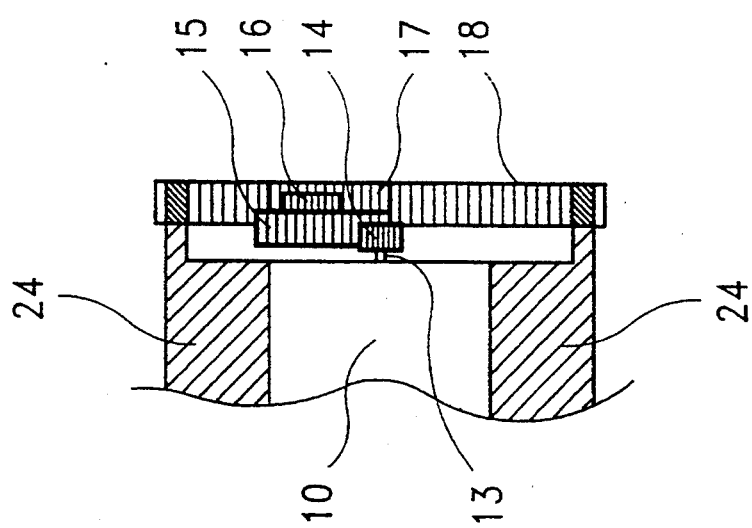
FIG. 2B is a cross section taken along line B—B of FIG. 2A.
Figure 2A:
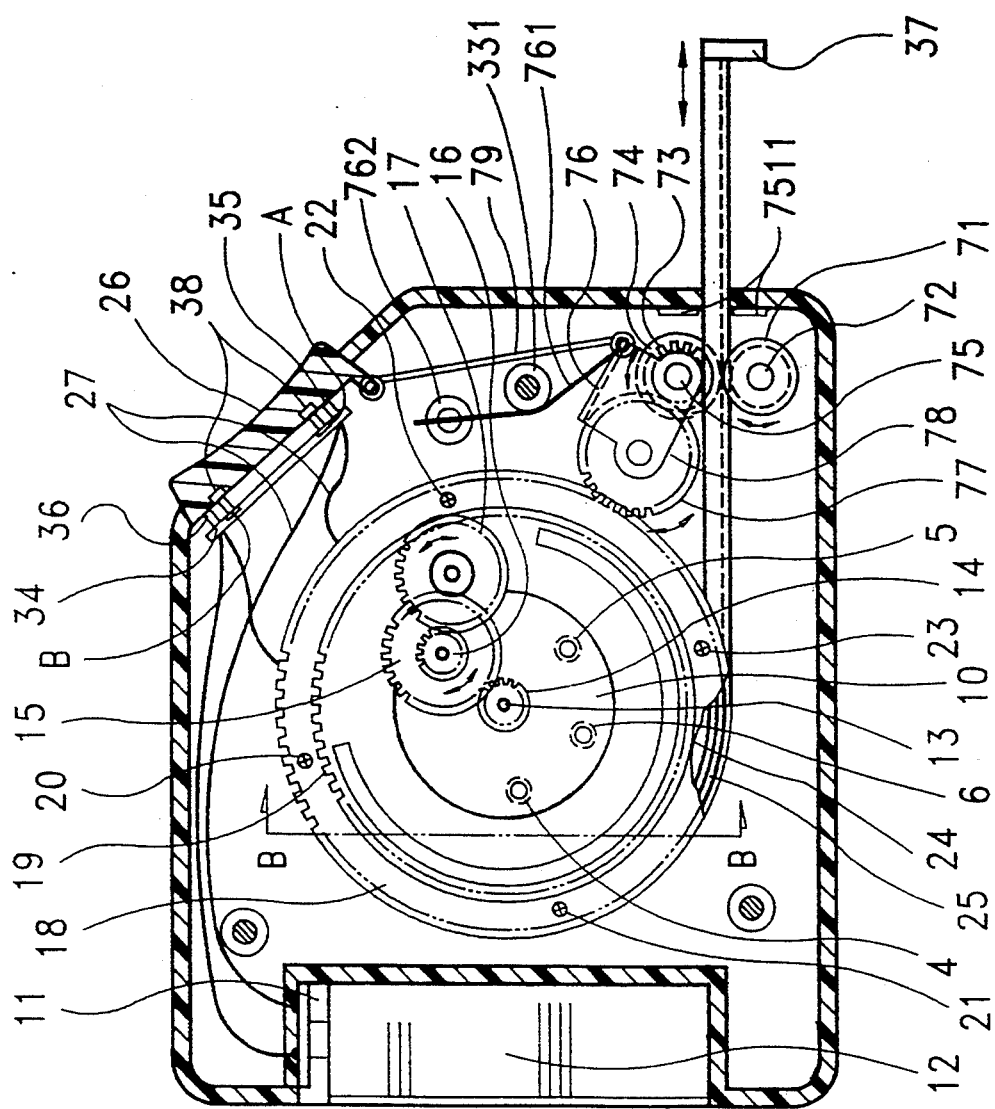
FIG. 2A is a cross section taken along line A—A of FIG. 2.

Referring to FIGS. 1, 2, 2A, 2B, AND 3, the housing 1 of the measuring tape is made in a substantially rectangular shape consisted of an upper casing 2 and a lower casing 3 respectively made from a transparent plastic material through an injection molding process. The upper casing 2 and the lower casing 3 are fastened together by screws 31;32;33. Screws 41;51;61 are inserted through respective through holes (not shown) on the upper casing 2 and threaded into respective screw holes 4;5;6 on a reversible motor 10 to fasten the reversible motor inside the housing 1 in the center of a tape reel 24. A battery chamber 11 is defined inside the housing 1 to hold a rechargeable battery set 12, which is electrically connected to the reversible motor 10. The battery chamber 11 has a power input socket (not shown) through which an external power supply is connected to charge the rechargeable battery set 12. A drive gear 14 is mounted on the output shaft 13 of the reversible motor 10 and meshed with a driven gear 15. The driven gear 15 has a pinion 16 mounted on its gear shaft (not shown) and meshed with a transmission gear 17. The transmission gear 17 is meshed between the pinion 16 and the internal toothing 19 of an annular wheel 18. The annular wheel 18 is fastened to the tape reel 24 at one end by screws 20;21;22;23. Therefore, turning on the reversible motor 10 causes the transmission gear 17 to turn the annular wheel 18 and the tape reel 24 round and round in letting off or taking up the tape blade 25, which has a rear end (not shown) fixed to the tape reel 24 and wound round the rotating wheel 24 and a front end extended out of the housing 1 through an outlet 28 thereof and terminated to a true-zero hook 37. A contact plate 34 is connected to the electric wiring 27 between the reversible motor 10 and the rechargeable battery set 12, and controlled by a switch 26. The switch 26 is mounted on the housing 1, having two contacts 35;36 corresponding to two contacts A;B on the contact plate 34. As the switch 26 is pressed forward to connect the contact 35 with the contact A, the reversible motor 10 is actuated to rotate counterclockwise in letting off the tape blade 25 through the outlet 2. As the switch 26 is pressed backward to connect the contact 36 with the contact B, the reversible motor 10 is actuated to rotate clockwise in taking up the tape blade 25. The tape blade 25 has a cross section 29 curved inwards. This arrangement allows the tape blade 25 to be extended out of the housing 1 at a certain distance straight. An axle 72 is fastened between the upper and lower casings 2, 3 behind the outlet 28. A guide roller 71 is mounted on the axle 72, having a peripheral surface curved inwards and fitting over the curved cross section 29 of the blade 25 at the bottom. A small gear 73 and a pressing roller 74 are mounted on an axle 75 connected to a spring loaded movable frame 76. The presssing roller 74 is controlled by the movable frame 76 to press the tape blade 25 against the guide roller 71 and to move it out of the housing 1. The peripheral surface of the pressing roller 74 curves outwards, and fits over the curved cross section 29 of the tape blade 25 at the top. A big gear 77 is mounted on a locating post 78, which connects the movable frame 76 to the lower casing 3, and meshed between the annular wheel 18 and the small gear 73. There is a pull rod 79 having top end connected to the switch 26 and a bottom end connected to the movable frame 76. There is a spring plate 761 having a top one end fastened to a column 762 and a bottom end pressed on the movable frame 76. A column 331 is fastened inside the housing 1 and stopped at the spring plate 761 in the middle. The guide roller 71, axle 72, small gear 73, pressing roller 74, axle 75, movable frame 76, big gear 77, locating post 78, and pull rod 79 form a mechanism to control the output of the tape blade 25. As the contact 35 of the switch 26 is electrically connected to the contact A of the contact plate 34, the pull rod 79 is released, and the pressing roller 74 presses on the tape blade 25 against the guide roller 71. At the same time, the reversible motor 10 is turned on to turn the annular wheel 18 and the tape reel 24 causing the tape reel 24 to let off the tape blade 25. As the big gear 77 is meshed between the toothing around the outside wall of the annular wheel 18 and the small gear 73, rotating the annular wheel 18 causes small gear 73 to impart rotation to the pressing roller 74 in guiding out the tape blade 25. The gear ratio between the annular wheel 18 and the big and small gears 77;73 is properly designed so that the revolving speed of the pressing roller 74 is slightly faster than the annular wheel 18 (tape reel 24). This special design is to let the blade 25 be guided out of housing 1 by the guide roller 71 and the pressing roller 74 faster than the blade letting-off speed, and therefore the tape blade 25 is stretched and will not be disorderly loosened on the tape reel 24 when it is delivered out of the housing 1. As the contact 36 of the switch 26 is electrically connected to the contact B of the contact plate 34, the pull rod 79 is moved upwards in pulling movable frame 76 upwards, and therefore the pressing roller 74 is carried away from the tape blade 25. At the same time, the tape blade 25 is taken up by the tape reel 24. Because the pressing roller 74 is released from the tape blade 25 as the blade 25 is being taken up, no resistance is given to the tape blade 25 during its return movement.

The switch 26 is a FORWARD/BACKWARD/-STOP three-step switch controlled to turn the reversible motor 10 in either direction, or to stop it from operation. Spring means 38 is fastened to the switch 26 which constantly supports the switch 26 in the "STOP" position.

Figure 4A:
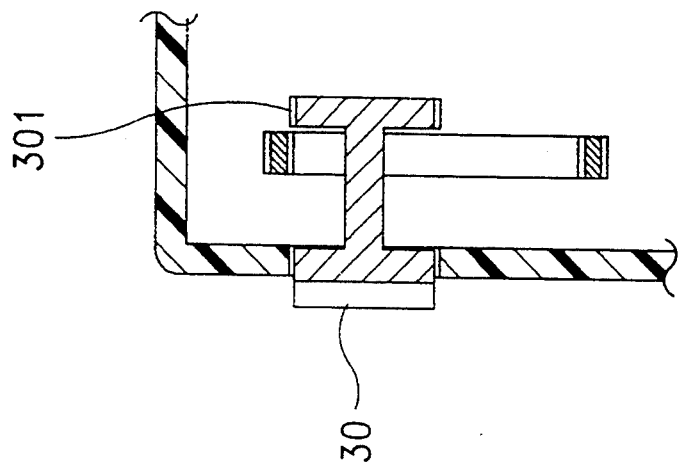
FIG. 4A is a cross section taken along line A—A of FIG. 4.
Figure 4:
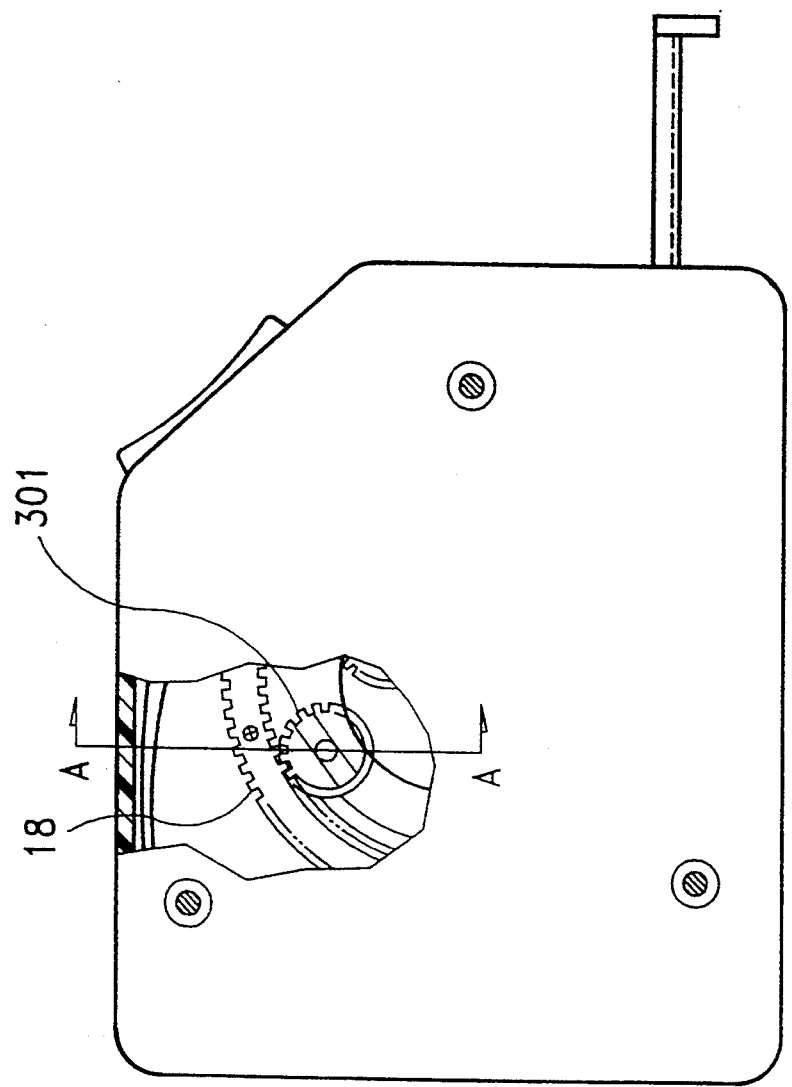
FIG. 4 illustrates the structure and position of a slotted winding knob in the housing of the measuring tape of FIG. 1 relative to the annular wheel thereof.
Figure 5:
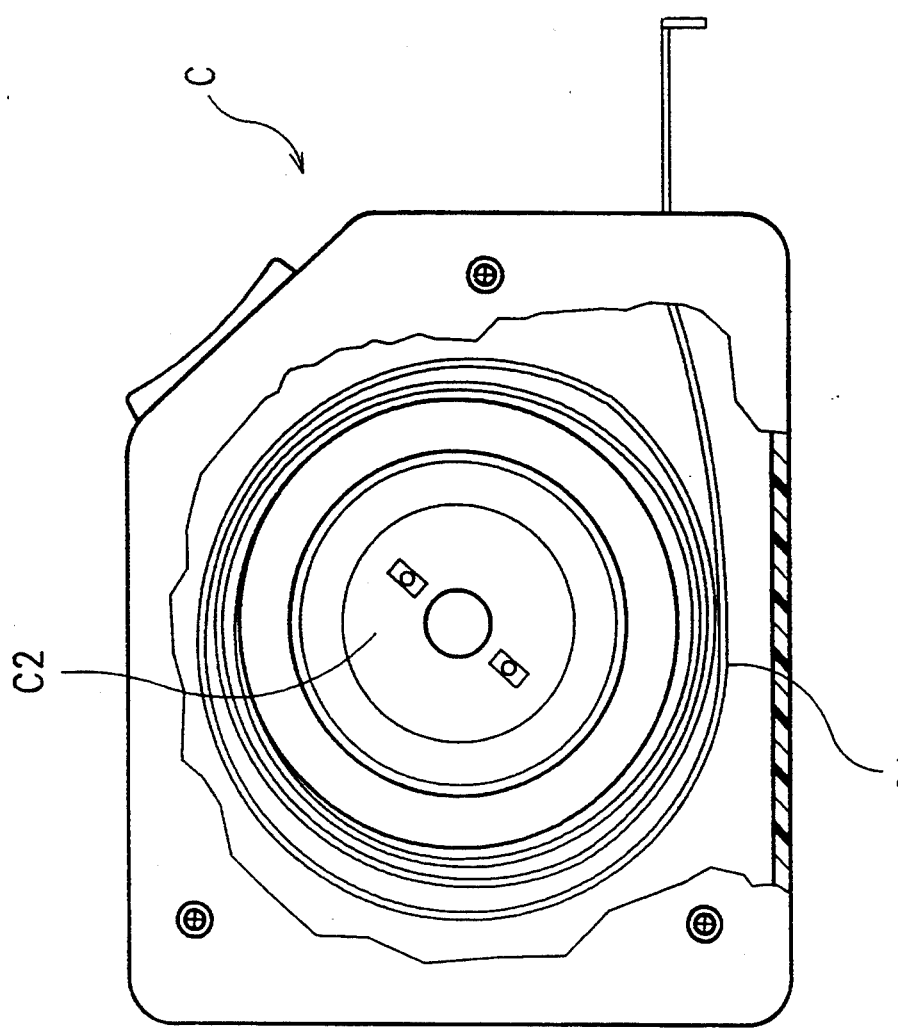
FIG. 5 is a schematic drawing of a prior art measuring tape showing the blade disorderly loosened.

Referring to FIG. 4 and 4a there is a slotted revolving knob 30 fastened to the housing 1, having a bottom end coupled with a gear 301. The gear 301 is disposed beneath the annular wheel 18 when the slotted revolving knob 30 is pressed down. Pulling the slotted revolving knob 30 upwards causes the gear 301 to engage with the internal toothing 19 of the annular wheel 18, and therefore the annular wheel 18 can be rotated by the slotted revolving knob 30 to drive the tape reel 24 causing it to let off or take up the tape blade 25.

While only the preferred embodiment of the present invention has been shown and described, it will be understood that various modifications and changes could be made without departing from the spirit and scope of the invention. For example, two strips of felt 7511 (see FIG. 2A) may be fastened to the blade outlet on the inside at two opposite location to protect against entrance of outside dust and water, and to remove dust and water from the tape blade during the rewinding operation.

What is claimed is:

1. A measuring tape comprising a tape reel driven by a reversible motor drive unit through a transmission mechanism and controlled by a forward/backward/-stop three-position switch to let off a tape blade for taking measurements or to rewind it automatically, and a blade output delivery control mechanism controlled by said switch to pull said tape blade out of the tape housing through a blade outlet thereof, wherein said transmission mechanism comprises a drive gear mounted on the output shaft of said reversible motor drive unit, a transmission gear meshed with an internal toothing on an annular wheel, a step gear meshed between said transmission gear and said drive gear, said annular wheel being fastened to said tape reel at a bottom of said tape reel said annular wheel being driven by said drive gear through said step gear and said transmission gear to turn said tape reel, upon working of said reversible motor drive unit, causing said tape reel to let off or rewind said tape blade; said blade output delivery control mechanism comprises a guide roller and a movable pressing roller controlled to deliver said tape blade out of an outlet of the measuring tape at a speed faster than the revolving speed of said tape reel, a small gear fastened to said pressing roller at one end, a big gear meshed between said small gear and an external toothing around an outside wall of said annular wheel, a spring loaded moveable frame having a first end connected to the axle on which said big gear is mounted, a second end connected to the gear shaft of said small gear, and a third end connected to said switch by a pull rod, and a pressure spring having one end fixed and an opposite end freely pressed on said movable frame against said small gear and said pressing roller, said pull rod being pulled upwards to lift said pressing roller away from said guide roller when said switch is moved to a backward position, said pull rod being moved downwards to lower said movable frame, causing said pressing roller to press on the blade against said guide roller for permitting the blade to be guided out of the housing of the measuring tape through said blade outlet when said switch is moved to a forward position.

2. The measuring tape of claim 1 wherein said guide roller has a peripheral surface curved inwards that fits over the bottom surface of said tape blade; said pressing roller has a peripheral surface curved outwards that fits over the top surface of said tape blade.

3. The measuring tape of claim 1 wherein said blade outlet is fastened with strips of felt on an inside of the housing to protect against entrance of outside dust and water, and to remove dust and water from said tape blade during a rewinding operation.

* * * * *